(12) United States Patent
Chapman et al.

(10) Patent No.: US 9,676,338 B2
(45) Date of Patent: Jun. 13, 2017

(54) REINFORCED BLOW MOULDED VEHICLE RUNNING BOARD AND METHOD OF MAKING SAME

(71) Applicant: METELIX PRODUCTS INC., Brampton (CA)

(72) Inventors: Tim Chapman, Etobicoke (CA); Roger Elgner, Toronto (CA)

(73) Assignee: METELIX PRODUCTS INC., Brampton, ON (CA)

( * ) Notice: Subject to any disclaimer, the term of this patent is extended or adjusted under 35 U.S.C. 154(b) by 1053 days.

(21) Appl. No.: 13/902,918

(22) Filed: May 27, 2013

(65) Prior Publication Data

US 2013/0323454 A1 Dec. 5, 2013

Related U.S. Application Data

(60) Provisional application No. 61/653,576, filed on May 31, 2012.

(51) Int. Cl.
*B60R 3/00* (2006.01)
*B60R 19/03* (2006.01)
(Continued)

(52) U.S. Cl.
CPC .............. *B60R 3/002* (2013.01); *B29C 49/04* (2013.01); *B29C 49/20* (2013.01); *B60N 2/68* (2013.01);
(Continued)

(58) Field of Classification Search
CPC . B60R 3/002; B60R 3/00; C08L 23/00; C08L 23/04; C08L 23/06; C08L 23/08;
(Continued)

(56) References Cited

U.S. PATENT DOCUMENTS 4,951,986 A * 8/1990 Hanafusa ................ B60R 19/18
293/120
5,219,913 A * 6/1993 Tomomatsu ............ C08L 23/10
524/505
(Continued)

FOREIGN PATENT DOCUMENTS

EP 0652138 A1 * 5/1995 ............ B60R 19/18
JP 05000445 A * 1/1993
(Continued)

OTHER PUBLICATIONS

Translation (J-PlatPat) of JP 2002-047381 A. Translated Jun. 20, 2016.*
(Continued)

*Primary Examiner* — Maria Veronica Ewald
*Assistant Examiner* — Ethan A Utt

(57) ABSTRACT

A structurally reinforced blow molded assembly includes an overmold body bonded to one or more preformed internal stiffening ribs. The reinforcing r ribs are partially encapsulated by o the overmold body in an orientation selected to carry load a forces thereon. The resin mixture used to form the overmold body comprises 10% to 40% by weight short glass having a length less about 15 cm, and 60% to 90% by weight thermoplastic resin. To facilitate recycling the reinforcing ribs comprise 30 to 60% by weight long glass fibers and 40% to 70% of thermoplastic bonding resin.

25 Claims, 10 Drawing Sheets

(51) Int. Cl.
B29C 49/20 (2006.01)
B29C 49/04 (2006.01)
B60N 2/68 (2006.01)
B29C 49/48 (2006.01)

(52) U.S. Cl.
CPC ...... B60R 19/03 (2013.01); *B29C 2049/2013* (2013.01); *B29C 2049/2017* (2013.01); *B29C 2049/2086* (2013.01); *B29C 2049/4882* (2013.01); *Y10T 428/237* (2015.01)

(58) Field of Classification Search
CPC .......... C08L 23/10; C08L 23/12; C08L 23/14; C08L 55/02; B29C 49/20; B29C 2049/2013; B29C 2049/2017; B29C 49/48; B29C 2049/4882; B29C 49/54; B29C 49/541; B29C 49/04; B29C 2049/48; B29C 2049/20; B29C 2049/04; B29C 70/74; B29C 70/742; B29C 70/68; B29C 70/681; B29C 70/682; B29C 70/683; B29L 2031/30
USPC ......... 280/163, 164.1, 164.2, 165, 166, 169; 264/510–516
See application file for complete search history.

(56) References Cited

U.S. PATENT DOCUMENTS

| | | | |
|---|---|---|---|
| 5,658,027 A | * | 8/1997 | Eissinger ................ B29C 49/20 293/120 |
| 5,727,357 A | * | 3/1998 | Arumugasaamy ........ E04C 5/07 428/377 |
| 2003/0015279 A1 | * | 1/2003 | Kusek ................... B29C 70/521 156/166 |
| 2005/0067741 A1 | * | 3/2005 | Chapman ................ B29C 49/20 264/516 |
| 2007/0296175 A1 | * | 12/2007 | Flajnik ................... B60R 3/002 280/169 |

FOREIGN PATENT DOCUMENTS

| | | | | |
|---|---|---|---|---|
| JP | 05092744 A | * | 4/1993 | |
| JP | 08034052 A | * | 2/1996 | |
| JP | 2002047381 A | * | 2/2002 | |
| JP | 2002067807 A | * | 3/2002 | |

OTHER PUBLICATIONS

Translation (J-PlatPat) of JP 2002-067807 A. Translated Jun. 20, 2016.*
Machine translation of JP 05-000445 A. Translated Feb. 2, 2017.*
Machine translation of JP 05-092744 A. Translated Feb. 2, 2017.*
Machine translation of JP 08-034052. Translated Jun. 20, 2016.*

* cited by examiner

FIGURE 4
FIGURE 5
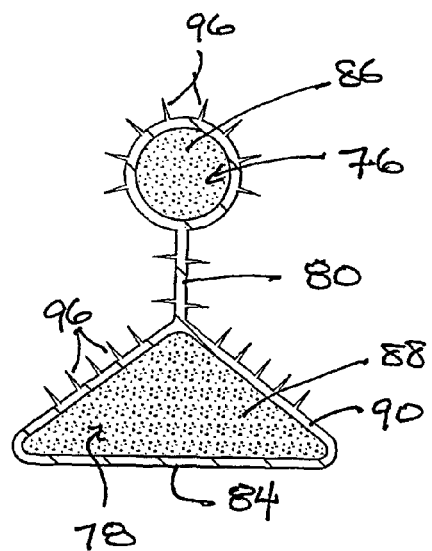
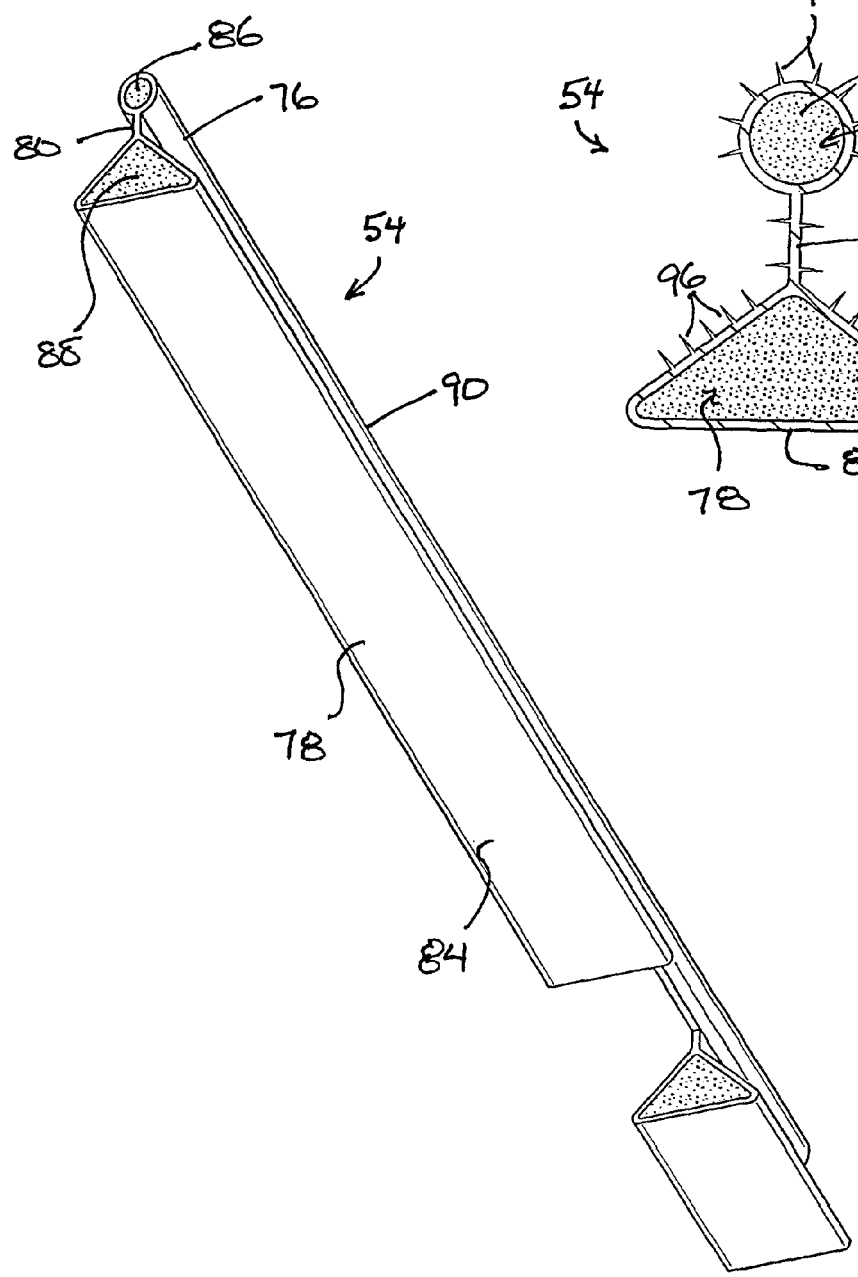

REINFORCED BLOW MOULDED VEHICLE RUNNING BOARD AND METHOD OF MAKING SAME

RELATED APPLICATIONS

This application claims the benefit of 35 USC 119(e) to U.S. Provisional Patent Application Ser. No. 61/653,576, filed May 31, 2012.

SCOPE OF THE INVENTION

The present invention relates to reinforced blow moulded articles, more preferably blow moulded vehicle parts such as running boards, seat backs, load floors and bumper beams which are provided with one or more internal stiffening or reinforcing ribs to provide structural reinforcement. More preferably the articles are provided with one or more fiber-reinforced plastic stiffening ribs formed having a composition which is complementary to that of a blow moulded plastic overmould body to facilitate the reuse and recycling of waste flash and/or rejected articles by regrinding and re-melt, as part of a thermoplastic base resin used overmould production.

BACKGROUND OF THE INVENTION

The manufacture of blow moulded articles for use as vehicle parts is known. In the case of larger vehicle parts which are provided for either structural applications, or which, as a result of design requirements, are required to provide bend or deformation resistance, conventionally one or more rib-like reinforcing webs are moulded directly into the part sidewall.

FIG. 1 shows a cutaway perspective bottom view of a prior art blow moulded running board 10 produced in accordance with conventional manufacturing processes. The running board 10 is formed by blow moulding a thermoplastic resin parison in a mould having a desired overall elongated shape. After moulding, the running board 10 is formed having a generally hollow interior 100 which is delineated by a moulded resin sidewall 12, and which defines generally parallel spaced and longitudinally extending upper tread and bottom surfaces 18,20 which are joined to each other along the respective front and rear sides by forward and rear side webs 22,24.

As shown in FIG. 1, the bottom surface 20 of the running board 10 is adapted for mounting at its end and mid-portions, against three or more L-shaped steel brackets (brackets 28a,28b shown), which in turn are secured directly to a side of a vehicle frame (not shown). To facilitate proper positioning and mounting, the bottom surface 20 may include a series of moulded spaced recesses 30. Each recess 30 is moulded directly into the sidewall 12 and is sized for alignment and juxtaposed engagement with an associated bracket 28, respectively.

The sidewall 12 further defines a series of longitudinally aligned V-shaped reinforcing webs 32 formed in the bottom surface 20, and which extend between the recesses 30. As shown in the cutaway view, the reinforcing webs 32 are formed with an upwardly tapering V-shape and terminate at an uppermost bight immediately adjacent to the underside 18a of the upper tread surface 18. The taper angle of the V-shape of the reinforcing webs 32 is chosen to prevent the running board 10 from binding within the mould following its formation, and facilitate its removal therefrom after moulding operation.

The inventors have appreciated that conventional prior art running boards 10 suffer various disadvantageous. In particular, as a result of their angular geometry, the V-shaped reinforcing webs 32 achieve less structural reinforcement than, for example, a planar I beam or vertical-web reinforcement designs. In addition, as a result of mould limitations, it is not possible to provide reinforcing structures between the running board upper tread surface 18 and the moulded bracket recesses 30. As a result, conventional blow moulded running boards 10 suffer the disadvantage that in their design, unreinforced weakness points exist which could result in premature deformation and/or part failure in the event of loading.

SUMMARY OF THE INVENTION

To at least partially overcome some of the difficulties associated with prior art designs, the present invention provides a structurally reinforced blow moulded article or assembly. The assembly includes an overmould member or body which is formed from a glass fiber or graphite reinforced thermoplastic base resin mixture, and which is bonded to and/or at least partially encapsulates one or more preformed internal stiffening or reinforcing inserts or ribs. The reinforcing inserts or ribs (hereinafter collectively referred to as ribs) are preferably at least partially encapsulated by and/or melt fused to the overmould member by blow moulding in an orientation selected to at least partially carry load and/or impact forces thereon.

The base resin mixture used in the formation of the overmould member preferably comprises between about 10% to 40% by weight short glass, polycarbonate and/or graphite fibers having a length less than about 15 cm, and about 60% to about 90% by weight thermoplastic resin. To facilitate the recycling and reuse of not only waste flash, but more preferably also damaged or defective finished parts, the reinforcing ribs preferably comprise between about 30 to 70% by weight long glass or graphite fibers having longitudinal length greater than about 25 cm, preferably greater than 50 cm, and most preferably which extend the entire longitudinal rib length; and about 30% by weight to 70% by weight of thermoplastic bonding resin.

The applicant has appreciated that with the foregoing overmould and rib compositions, both waste flash, as well as any defective ribs and/or finished products advantageously may be reground and blended for re-use as part of thermoplastic base resin/short fiber mixture in the blow moulding of subsequent overmould parts, minimizing manufacturing waste. Most preferably, the overmould body is formed by blow moulding a resin mixture comprising between about 20% to 30% by weight short glass fibers and 70% to 80% by weight of a thermoplastic base resin selected from polyethylene, polypropylene, and/or acrylonitrile butadiene styrene (ABS). Other thermoplastics and/or thermoplastic resins may however be used, depending upon the completed article and/or its intended application.

The short glass fibers preferably have a longitudinal length selected at less than about 10 cm, preferably less than about 1 cm, and most preferably less than about 0.5 cm.

Although not essential, in a preferred construction the bonding resin used in the formation of the rib is the same as, or complimentary to, the base resin used in the formation of the overmould body.

It is envisioned that the reinforced assembly may be used for the manufacture of a variety of different types of blow moulded articles. In one preferred application, the reinforced assembly is produced as a vehicle part, and which may include by way of non-limiting example a vehicle running board, a seat back, a vehicle load floor, and/or a vehicle bumper beam. The assembly is, however, applicable to the manufacture of other vehicle parts and classes of reinforced blow moulded articles.

Although not essential, in one preferred configuration, the reinforcing rib is provided with a generally I-beam shaped profile, having a pair of spaced lateral flanges joined by a longitudinally extending connecting web. The rib preferably has a lateral width of between about 0.5 to 1 cm and is provided with an upper edge which follows the general contour of a forward or top surface of the overmoulded body to be reinforced. Most preferably, the rib has a height selected to extend forwardly in a general perpendicular orientation from a rear surface of the overmould body to engagedly support the underside of the forward surface. Other rib profiles, however, may also be used including those with either a simple rectangular or L-shaped profiles.

In a most simplified construction the reinforcing rib may be manufactured having a homogeneous internal composition. In an alternate construction, to facilitate melt bonding with the overmould body, the reinforcing rib may be formed having an compound structure in which the connecting web is formed substantially entirely of thermoplastic resin, and one or both rib flanges are formed having long glass fiber reinforced cores which are at least partially coated with an outer thermoplastic resin layer. Optionally, the stiffening rib may be further provided with a series of longitudinally spaced radial projections, webs, bosses, suitable barbs or other suitable fingers (hereinafter collectively referred to as fingers). The fingers have a size selected to facilitate their preferential melting during overmoulding operations to enhance the anchoring and positioning of the rib and its melt attachment to the overmould body.

Accordingly, in one aspect the present invention resides in a structurally reinforced blow moulded assembly, the assembly comprising, an overmould member, said overmould member having sidewall defining a hollow interior, a forward support surface and rear surface generally parallel to and spaced from the forward support surface, the overmould member comprising between about 10% by weight to 30% by weight short glass fibers, and about 70% by weight to 90% by weight of a thermoplastic base resin, wherein said short glass fibers having a longitudinal length selected at less than about 10 cm, and preferably less than about 1 cm, at least one longitudinally elongated reinforcing rib insert, said rib insert being partially encapsulated by said sidewall including, a forward flange member provided for bearing contact with an interior side of said forward support surface, a rearward flange member spaced from the forward flange member and providing a rearward bearing surface generally coplanar with said rear surface, and a longitudinal extending connecting web joining the forward flange to the rearward flange, each of the forward and rearward flanges comprising about 40% by weight to about 70% by weight long glass fibers, and about 30% by weight to about 60% by weight of a bonding resin, wherein said long glass fibers have a longitudinal length greater than about 25 cm, and preferably a length corresponding to a longitudinal length of said rib.

More preferably, the reinforcing rib insert has a longitudinal length greater than about 0.5 m, and preferably greater than about 1.0 m, the connecting web has a lateral thickness selected at less than about 3 mm, and preferably less than about 1 mm, and the forward flange member and the rearward flange member have a maximum lateral width selected at between about 0.5 cm and 4 cm, and preferably between about 0.75 cm and 2.5 cm.

In another aspect, the present invention resides in a structurally reinforced vehicle part, the vehicle part comprising, an overmould body having sidewall defining a hollow interior, a forward surface and rear surface spaced from the forward surface, the overmould body comprising between about 10% by weight to 30% by weight short glass fibers, and about 70% by weight to 90% by weight of a thermoplastic resin, wherein said short glass fibers having a longitudinal length selected at less than about 10 cm, a longitudinally elongated reinforcing rib reinforcing said forward surface against a rearward loud force, the reinforcing rib at least partially encapsulated by said sidewall and including, a longitudinally extending forward flange member in substantially bearing contact with a portion of said sidewall defining said forward surface, a longitudinally extending rearward flange member spaced from the forward flange member and having a rearward bearing surface disposed in a generally coplanar orientation with said rear surface, and a longitudinal extending connecting web joining the forward flange to the rearward flange, the reinforcing rib comprising about 30% by weight to about 70% by weight, and preferably upto 60% by weight long glass fibers having a longitudinal length greater than about 50 cm, and preferably a length corresponding to a longitudinal length of said rib, and about 30% by weight to about 70% by weight, and preferably 40% to 70% by weight of said thermoplastic resin.

In a further aspect, the present invention reside in a vehicle running board comprising: an overmould composite plastic step, said step having a sidewall defining a hollow interior portion, an upper support surface for supporting a user thereon, and a lower mounting surface spaced from the upper support surface, the step comprising between about 10% by weight short glass fibers having a longitudinal length selected at less than about 15 cm, and preferably less than about 1 cm, and about 70% by weight of a resin selected from the group consisting of ABS, polyethylene, and polypropylene, at least one reinforcing rib, said rib having an elongated longitudinally length and comprising, an upper flange member, a lower flange member, and a connecting web extending between and joining said upper and lower flange members, each of said upper and lower flange members comprising between about 40% by weight to 70% by weight long glass fibers having a longitudinal length greater than about 50 cm and preferably greater than about 100 cm, and about 30% by weight to about 60% by weight of said resin, said upper flange member and connecting web being substantially encapsulated within and retained by said sidewall, with an upper portion of said upper flange member disposed substantially adjacent to said upper support surface and a bottom portion of said lower flange member in substantially co-planar alignment with an adjacent portion of said rear surface, whereby load forces on said forward support surface are at least partially carried by said rib.

BRIEF DESCRIPTION OF THE DRAWINGS

Reference may be had to the enclosed drawings together with the following detailed description, in which:

FIG. 4 shows a partial perspective view of the reinforcing rib used in the running board of FIG. 2 in accordance with a first embodiment of the invention;

FIG. 5 shows a cross-sectional view of a reinforcing rib for use in the running board of FIG. 2 in accordance with a second embodiment of the invention;

DETAILED DESCRIPTION OF PREFERRED EMBODIMENTS

Figure 1:
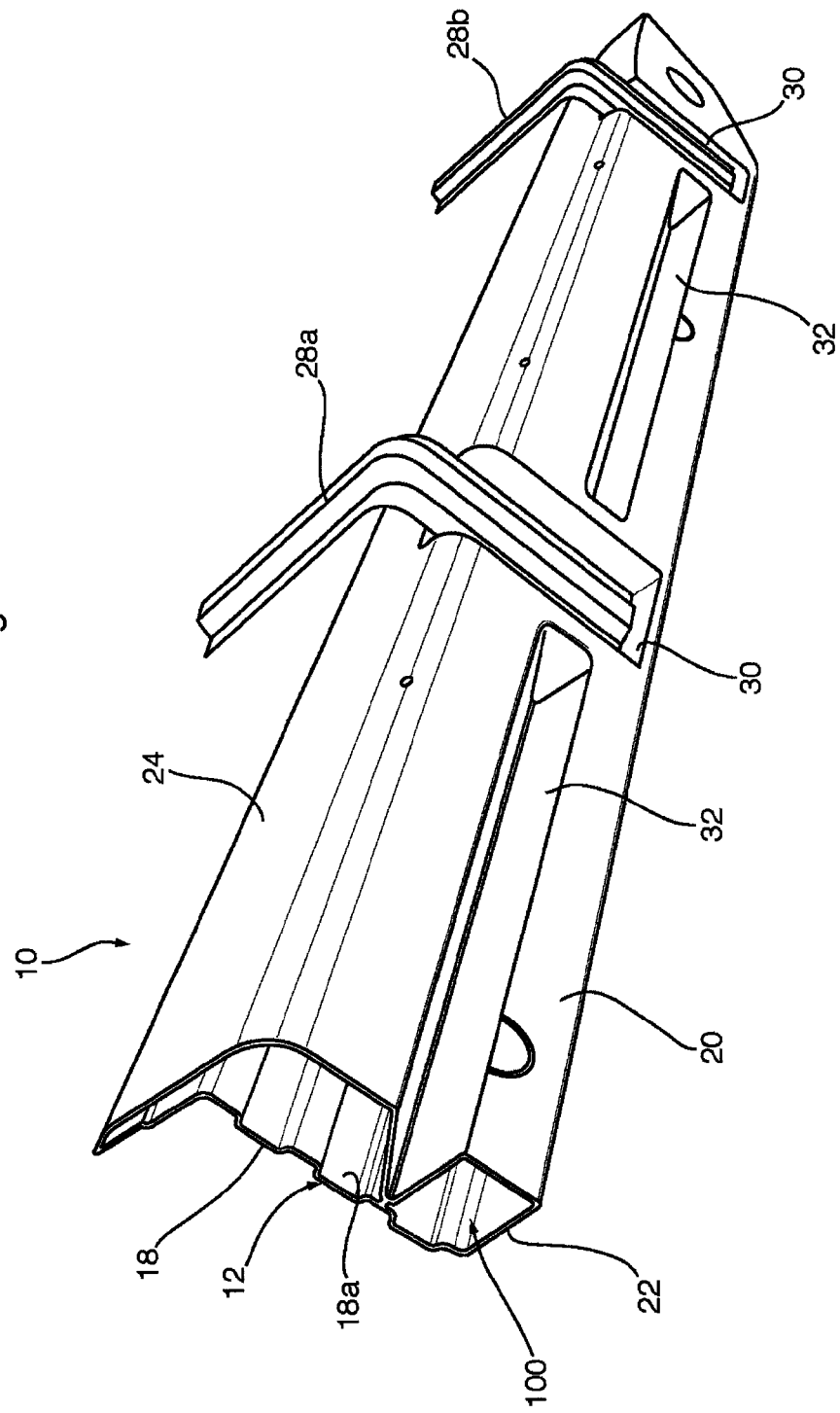
FIG. 1 shows a partial cutaway perspective bottom view of a conventional blow moulded vehicle running board in accordance with the prior art.
Figure 2:
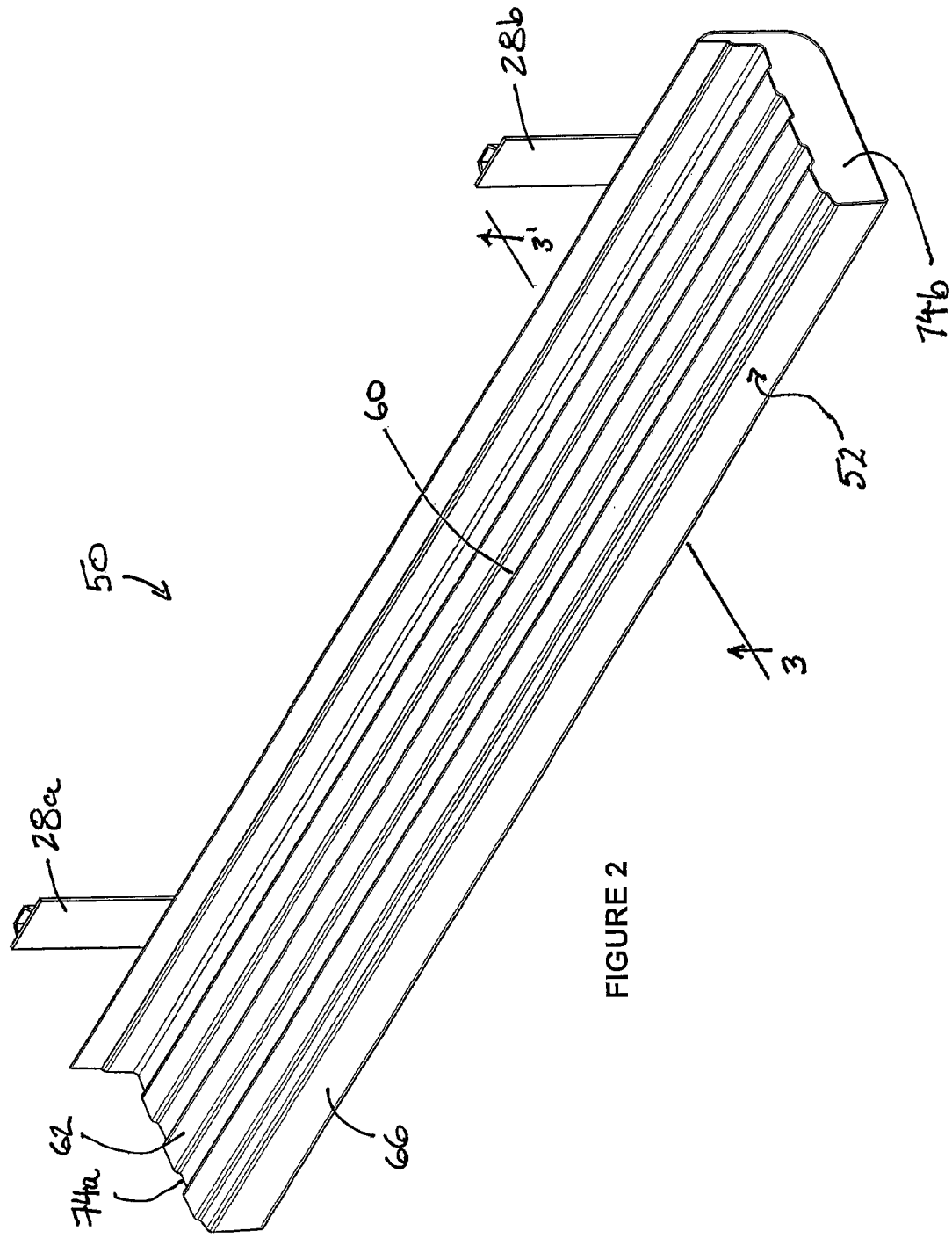
FIG. 2 illustrates a perspective view of a blow moulded vehicle running board in accordance with a first aspect of the invention.

Reference may be had to FIG. 2 which illustrates a thermoplastic glass fiber composite vehicle running board 50 which is manufactured in accordance with a most preferred aspect of the invention. The vehicle running board 50 is provided for mounting against a pair of conventional L-shaped steel mounting brackets 28a,28b for securement along the side of a vehicle (not shown). Depending on the application, the running board 50 has a typical longitudinal length selected at between about 1 and 2 meters, and a lateral step width of between about 10 and 20 cm. As will be described, the vehicle running board 50 is formed having internal structural reinforcement which provides the running board 50 with sufficient structural integrity to enable its securement to the vehicle using only the single pair of mounting brackets 28a,28b in supporting the running board 50 towards each respective longitudinal end, thereby reducing the running board installation time.

Figure 3:
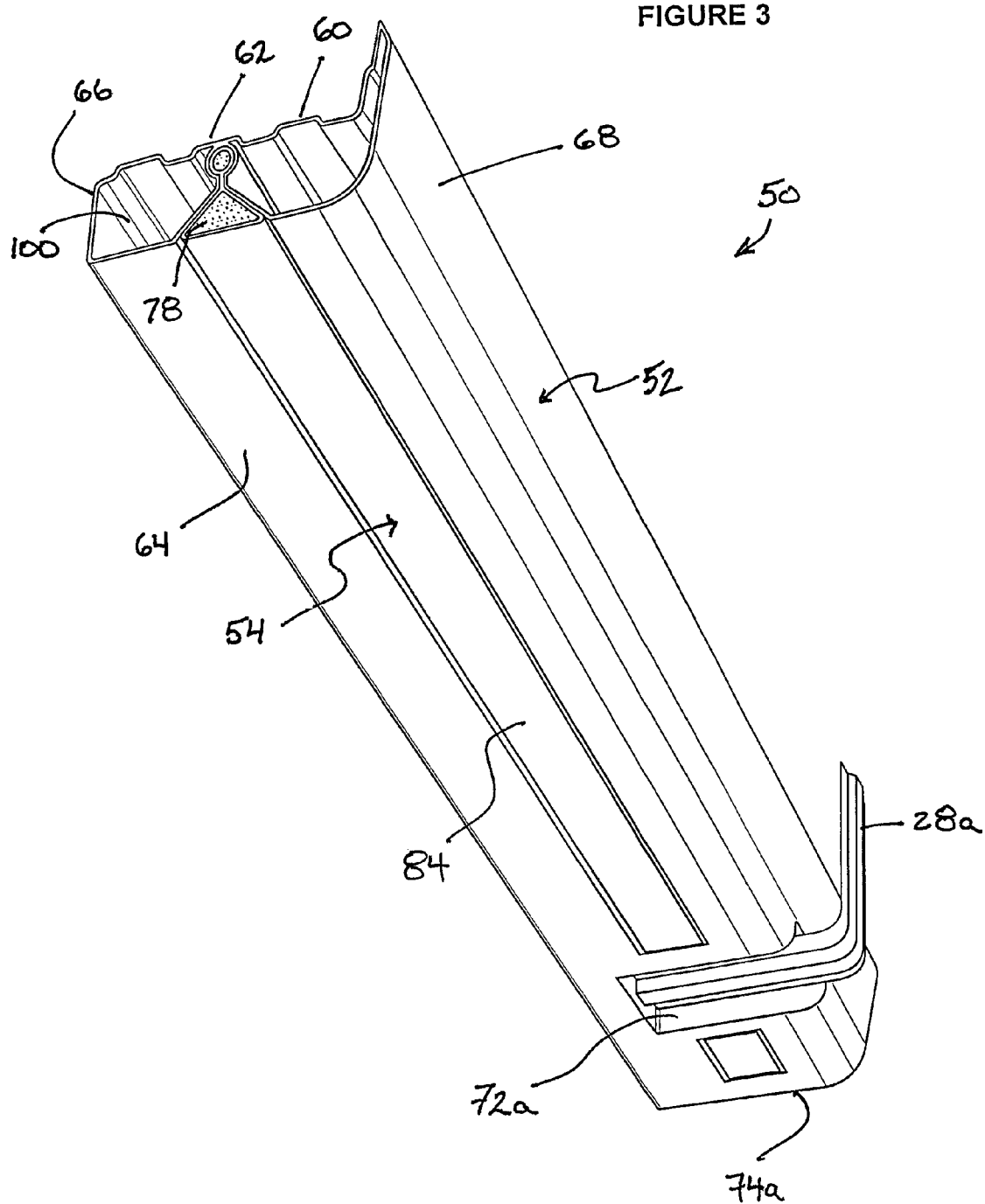
FIG. 3 shows a partially cut-away perspective bottom view of the running board of FIG. 2 taken along lines 3-3', showing the positioning of a reinforcing rib therein.

As shown best in FIG. 3 the running board 50 has a generally hollow open interior 100 and is formed having a binary construction consisting of a fiber reinforced thermoplastic sidewall 52 which is reinforced by a longitudinally extending fiber reinforced thermoplastic reinforcing rib 54. As will be described to manufacture the running board 50, the sidewall 52 is formed as a blow moulded overmould which partially encapsulates, and is melt bonded to the reinforcing rib 54 for enhanced structural rigidity. As shown best in FIG. 3, the sidewall 52 defines the overall running board profile. In this regard, the sidewall 52 delineates an upper surface 60 which includes the running board upper tread surface 62 for supporting a user thereon, a generally planar bottom surface 64 which is spaced from the tread surface 62, and forward and rearward connecting webs, 66,68 which merge with to join the upper and bottom surfaces 60,64. As shown best in FIGS. 3 and 4, the bottom surface 64 is formed having a pair of moulded recesses 72a,72b which are each spaced towards a respective running board end 74a,74b. The recesses 72a,72b are sized to receive therein the associated mounting bracket 28 in the securement of the running board 50 along the side of the vehicle.

FIG. 3 shows best the stiffening rib 54 as positioned to carry and transmit load forces on the sidewall 52 to the mounting brackets 28a,28b. As will be described, the rib 54 is moulded directly into the running board 50 itself, so as to extend in a generally vertical orientation along its longitudinal mid-axis.

The sidewall 52 and reinforcing rib 54 are both formed from complimentary fiber/resin compositions which are selected to enable waste flash, defective reinforcing ribs 52 and/or the entirety of any blemished or defective running boards 50 to be recycled for subsequent use in the manufacture of other thermoplastic blow moulded articles. Most preferably, the sidewall 52 is formed from a fiber reinforced thermoplastic base resin mixture which contains from about 10% by weight to about 30% by weight short glass fibers, and about 70% by weight to about 90% by weight of a base resin of ABS, polyethylene polypropylene or mixtures thereof. To facilitate blow moulding, the short glass graphite and/or polycarbonate fibers having a length of less than 1 cm, and more preferably less than about 0.5 cm.

The reinforcing rib 54 is formed having an overall composition which includes upto 50% by weight long glass graphite and/or polycarbonate fibers, and at least 50% by weight of a thermoplastic bonding resin. Although not essential, the long glass fibers are preferably selected from glass fibers which are comingled with a bonding resin, such as ABS, polyethylene, polypropylene or mixtures thereof, and which are heat fused in a generally parallel orientation. The long glass fibers 122 have a longitudinal length of preferably at least about 25 cm, and more preferably extend substantially the entire longitudinal length of the rib 54. For maximum recyclability, the bonding resin is most preferably is chosen the same as the base resin used in the formation of the sidewall 52 The applicant has appreciated that providing the reinforcing rib 54 having the aforementioned composition advantageously allows for simplified recycling and repurposing of defective or blemished ribs 54 and running boards 50. In particular, blemished or defective running boards 50 may be reground, and the reground material thereafter re-mixed into the base resin mixture for use in the blow moulding of sidewalls in the manufacture of a subsequent running board 50, and/or in the manufacture of further articles and parts.

FIG. 4 illustrates a partial perspective view of the reinforcing rib 54 in accordance with a first embodiment of the invention. The reinforcing rib 54 is provided with an elongated longitudinal length which extends substantially the longitudinal length of the running board 50. The rib 54 is provided with a pair of laterally extending spaced upper and lower flanges 76,78. The flanges 76 extend the longitudinal length of the rib 54 and are joined by a connecting web 80. The vertical height between the flanges 76,78 is selected such that following the encapsulation of the rib 54 by the sidewall 52, any load forces on the upper tread surface 62 along the entire length of the running board 50 are transmitted to and carried by the rib 54 onto the mounting brackets 28.

In the embodiment shown, the upper and lower flanges 76,78 are provided with a partially rounded cross-sectional profile. The applicant has appreciated that the rounded flange shape of the flanges 76,78 advantageously facilitate pultrusion moulding of the reinforcing rib 54. Most preferably, the upper flange 76 has a generally round cross-sectional profile having an approximate radially diameter selected at between about 1 and 2 cm. The lower flange 78 is formed having a flattened triangular cross-sectional profile. The lower flange 78 provides the rib 54 with a generally planar bottom 84 having a lateral width selected at between about 2 and 4 cm for dispensing load forces thereon, and which tapers upwardly to merge with the connecting web 80.

In the construction shown, the connecting web 80 has a lateral thickness selected at less than about 5 mm, preferably less than about 3 mm, and most preferably about 1 mm. Depending upon the size of the running board 50, the web 80 is formed having the vertical dimension between the flanges 76,78 selected at between about 0.3 and 1.5 cm. It is to be appreciated, however, that connecting webs of different dimensions may be used, depending upon the article of manufacture.

Although not essential, in a most preferred construction the reinforcing rib 54 is provided having a compound construction in which the upper and lower flanges 76,78 are provided respectively with a long fiber reinforced core, 86,88 which are each in turn further encapsulated by an outermost bonding layer 90. Preferably, each of the long fiber reinforced cores 86,88 are themselves composed of 40% by weight to about 70% by weight of the long glass fibers, and about 30% by weight to about 60% by weight of the bonding resin, and wherein the bonding resin is used to effect the melt fusion of the long glass fibers to each other in a generally parallel strand orientation. Although not essential, preferably the connecting web 80 is formed so as to consist entirely of bonding resin. The bonding layer 90 most preferably is also formed entirely of the bonding resin, to better facilitate the partial melt bonding and fusion with the sidewall 52 during overmoulding.

Figure 7:
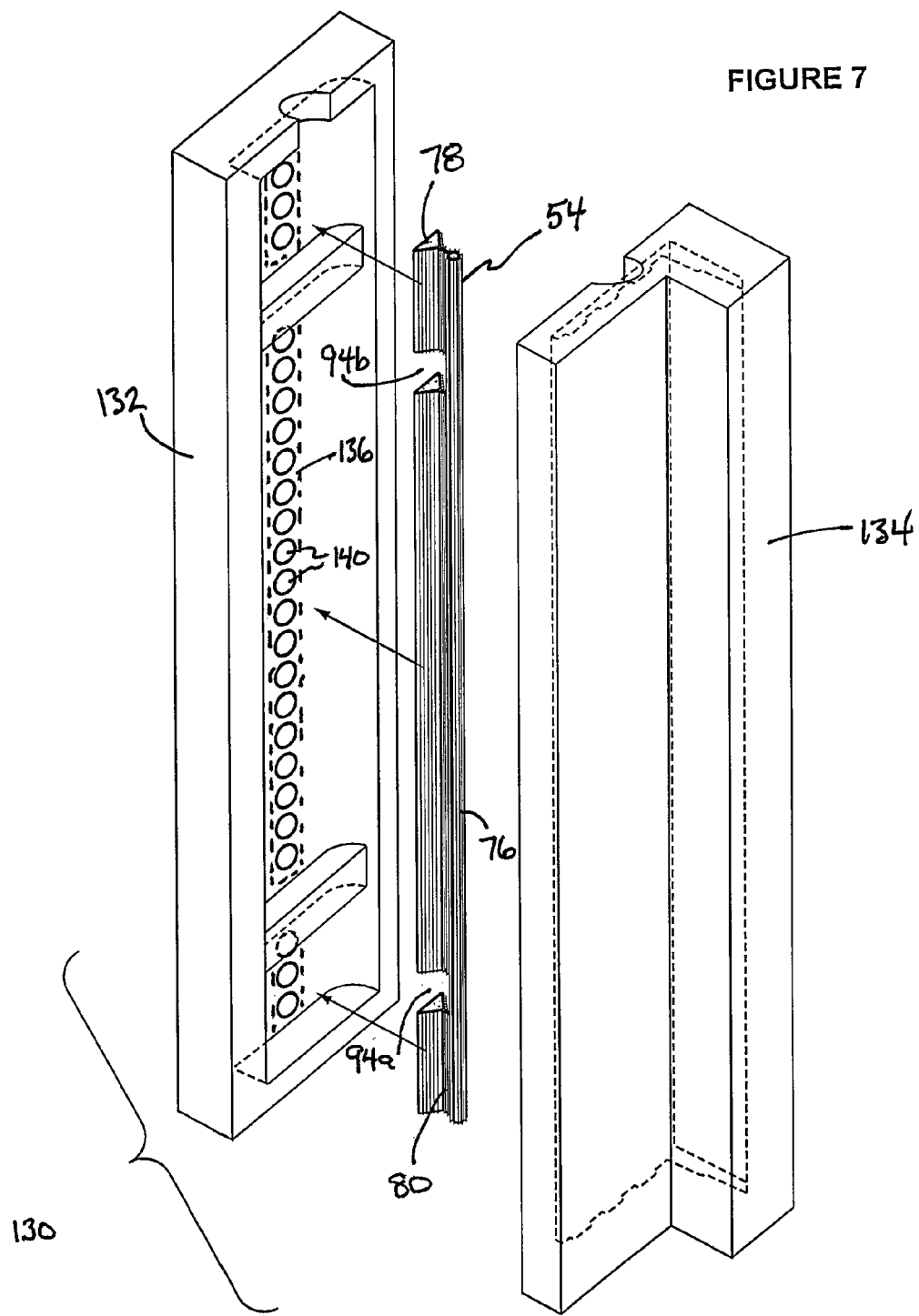
FIGS. 7 to 9 illustrate schematically the positioning of the reinforcing rib of FIG. 5 in a blow moulding die during blow moulding encapsulation and fusion of the overmould running board sidewall thereabout.

As shown best in FIG. 7, the reinforcing rib 54 is provided with a pair of cutouts 94a,94b. Each cutout 94 is sized and spaced for alignment with a corresponding recess 72a,72b. The cutouts 94 have a dimension selected such that in final assembly, the upper flange 76 of the rib 54 locates immediately adjacent to the underside of the upper tread surface 62 and the bottom 84 of the lower flange 78 in a substantially coplanar alignment with the adjacent portions of the bottom surface 64. So positioned, the upper flange 76 and connecting web 80 provides reinforcement to the running board 50 at each of the recesses 72a,72b. The extension of the cutout portions of the rib 54 over the recesses 72a,72b thus minimizes any points of weakness along the longitudinal length of the running board 50. Once vertically positioned, the stiffening rib 54 thus provides added structural support by transmitting load forces placed on the tread surface 62 directly and evenly through the running board 54, to the bottom surface 84.

Reference may be had to FIG. 5 which illustrates a pultrusion formed connecting rib 54 for use with the running board 50 in accordance with a further embodiment of the invention, and wherein like numerals are used to identify like components. In the rib 54 shown in FIG. 5, the portion of the bonding layer 90 in which defines the outermost perimeter of the upper flange 76 and connecting web 80 is further provided with a series of longitudinally extending melt fingers 96. The melt fingers 96 extend radially outwardly a distance of between about 0.5 and 1 mm, and have a thickness selected to preferentially melt and heat fuse with the sidewall 52 during overmoulding operation. The applicant has appreciated that the provision of the melt fingers 96 advantageously provide enhanced melt bonding between the reinforcing rib 54 and sidewall 52, to more securely fix the rib 54 against movement relative thereto.

Figure 6:
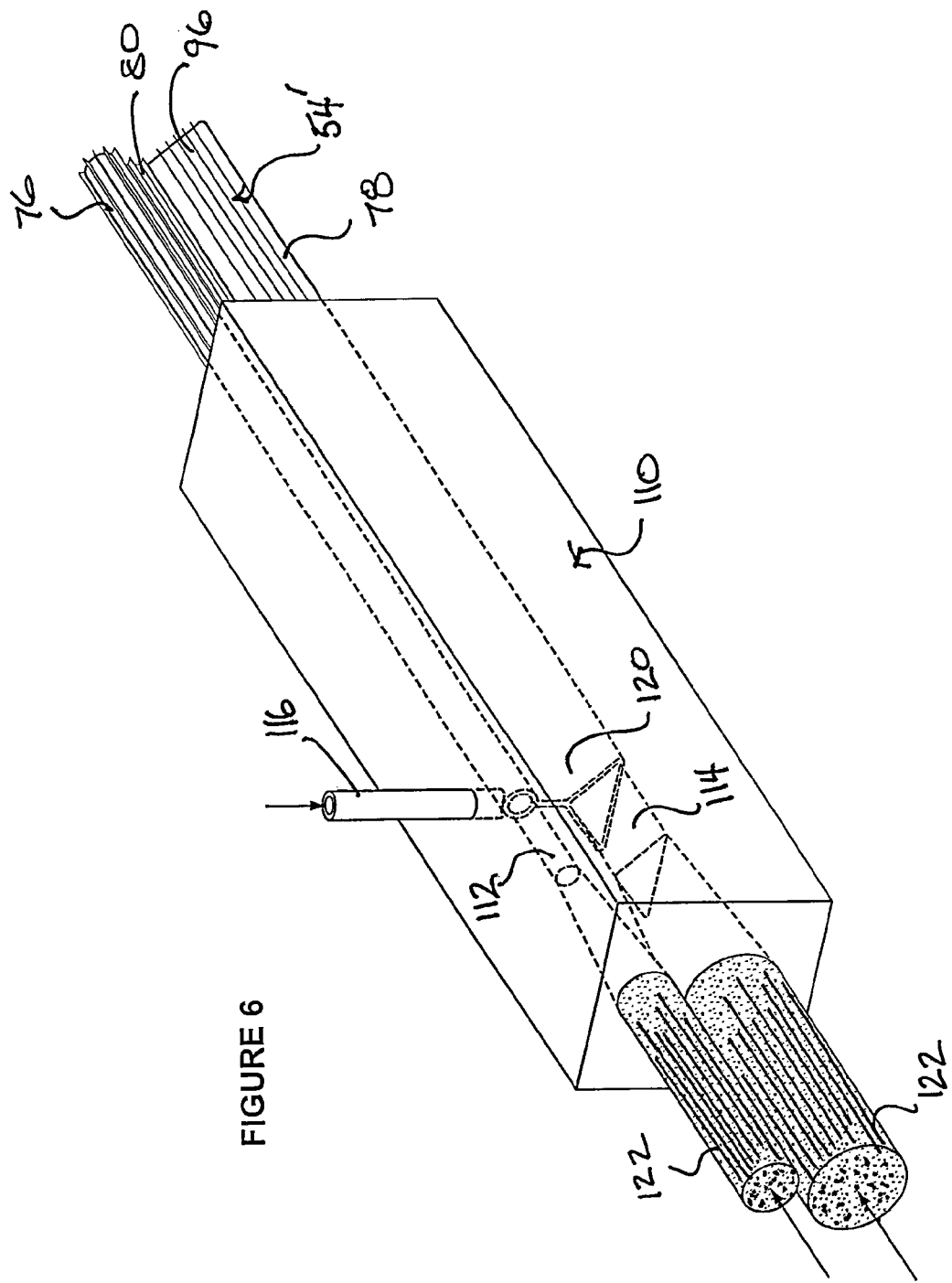
FIG. 6 shows schematically a moulding die used in the pultrusion moulding of the reinforcing rib shown in FIG. 5.

FIG. 6 shows schematically the manufacture of the reinforcing rib 54 shown in FIG. 5 by pultrusion moulding in accordance with a preferred method. FIG. 6 illustrates a pultrusion mould 110 which includes a pair of primary mould cavities 112,114 which are used to preform the long fiber reinforced cores 86,88 respectively, and a capstock feed inlet 116 which provides fluid communication with the secondary mould cavity 120 which is downstream from the primary cavities 112,114, and which is used from the finished rib profile. The capstock feed inlet 116 is used for the melt injection of bonding resin to form the outer bonding layer 90 and connecting web 80 about the heat bonded glass fiber cores 86,88.

As shown in FIG. 6, with the pultrusion mould 110, initially long glass fibers which have been co-mingled with the bonding resin are drawn into the primary mould cavities 112,114. Initially, parallel strands of thermoplastic co-mingled glass fibers are compacted and heated in each mould cavity 112,114 the mould at a temperature slightly above the resin decomposition temperature, to fuse the fibers and form reinforced cores 86,88 having the desired profile.

After partial melt fusing of the co-mingled fibers as the reinforced cores 86,88, the formed cores 86,88 drawn into the secondary mould cavity 120 where the bonding resin is melt injected via the capstock feed inlet 116 to form the bonding layer 90, connecting web 80 and melt fingers 96.

In one simplified form of manufacture, the stiffening rib 54 is formed by pultrusion by drawing polypropylene glass spooled threads through the pultrusion mould 110, while impregnating with a structural plastic bonding resin to form a finished rib blank 54'. The blank 54' is then cut to the desired longitudinal rib length, having regard to the length of the finished running board 50, and the cutouts 94a,94b are formed in a single stamping. The resulting formed, rib 54 is provided with melt fused glass fibers which have an axially length which extend the entire length of the rib 54, and which have a continuous length selected at between about 200 cm to 250 cm.

While in a preferred method of manufacture, the elongated glass fibers are drawn through the mould 110 so as to heat fuse to each other in a generally parallel arrangement, it is to be appreciated that in other constructions, the long glass fibers 122 may be pre-wound, braided, and/or twisted prior to being drawn into the mould 110. Similarly, while pultrusion provides various advantages in manufacture, it is to be appreciated that in alternate modes of manufacture, the rib 54 could also be formed by compression or injection moulding.

In a most preferred sidewall construction, the upper surface 60, bottom surface 64 and side webs 66,68 are integrally formed from a plastic/short fiber base resin parison mixture, consisting of polypropylene or ABS, and 10 to 30% glass fibers which have an average length of between about 0.1 cm and 0.5 cm. It is envisioned that the base resin mixture used to form the running board sidewall 52 includes both virgin and re-ground components including waste flash, as well as reground rejected pieces. The sidewall 52 is formed as an overmould body which is blow moulded over a preformed reinforcing rib 54 to substantially encapsulate and bond therewith.

Figure 8:
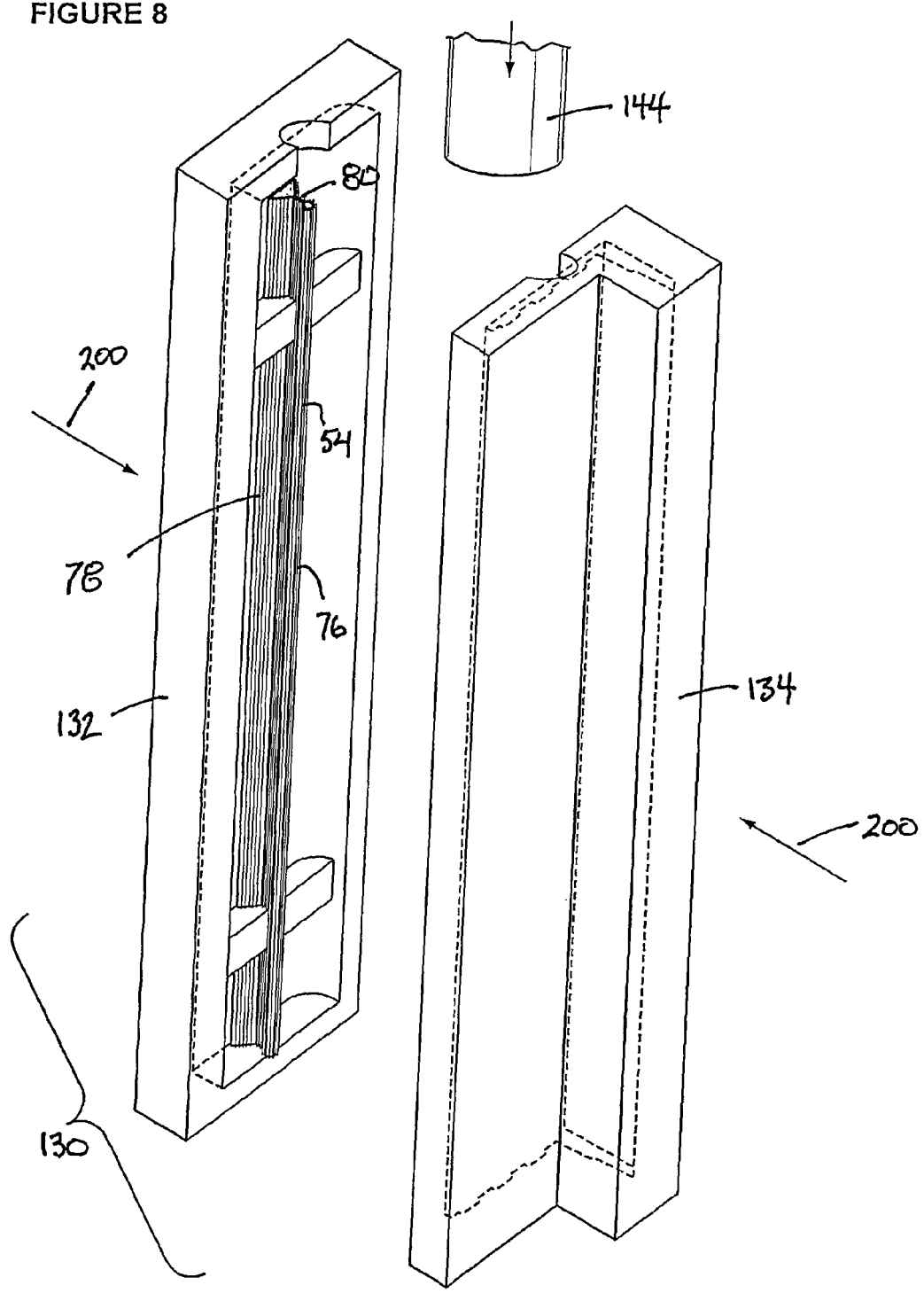
Figure 9:
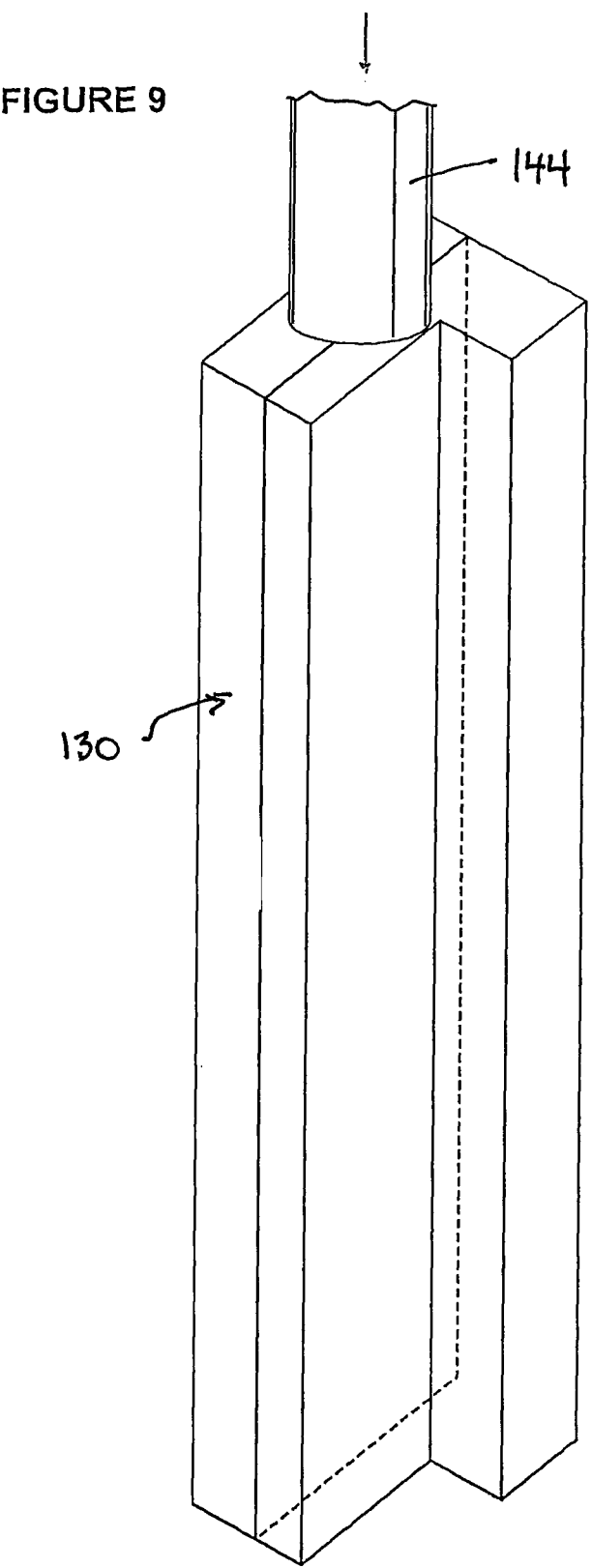

FIGS. 7 to 9 show best a two-part mould 130 used in the final manufacture of the running board 50 shown in FIG. 2. The mould 130 includes bottom and top mould platens 132,134. The bottom platen 132 is used to form the running board bottom surface 64, recesses 72a,72b and part of the connecting webs 66,68. The top platen 134 is used to form the upper surface 60 including the upper tread surface 62, as well as part of the connecting webs 66,68.

Figure 10:
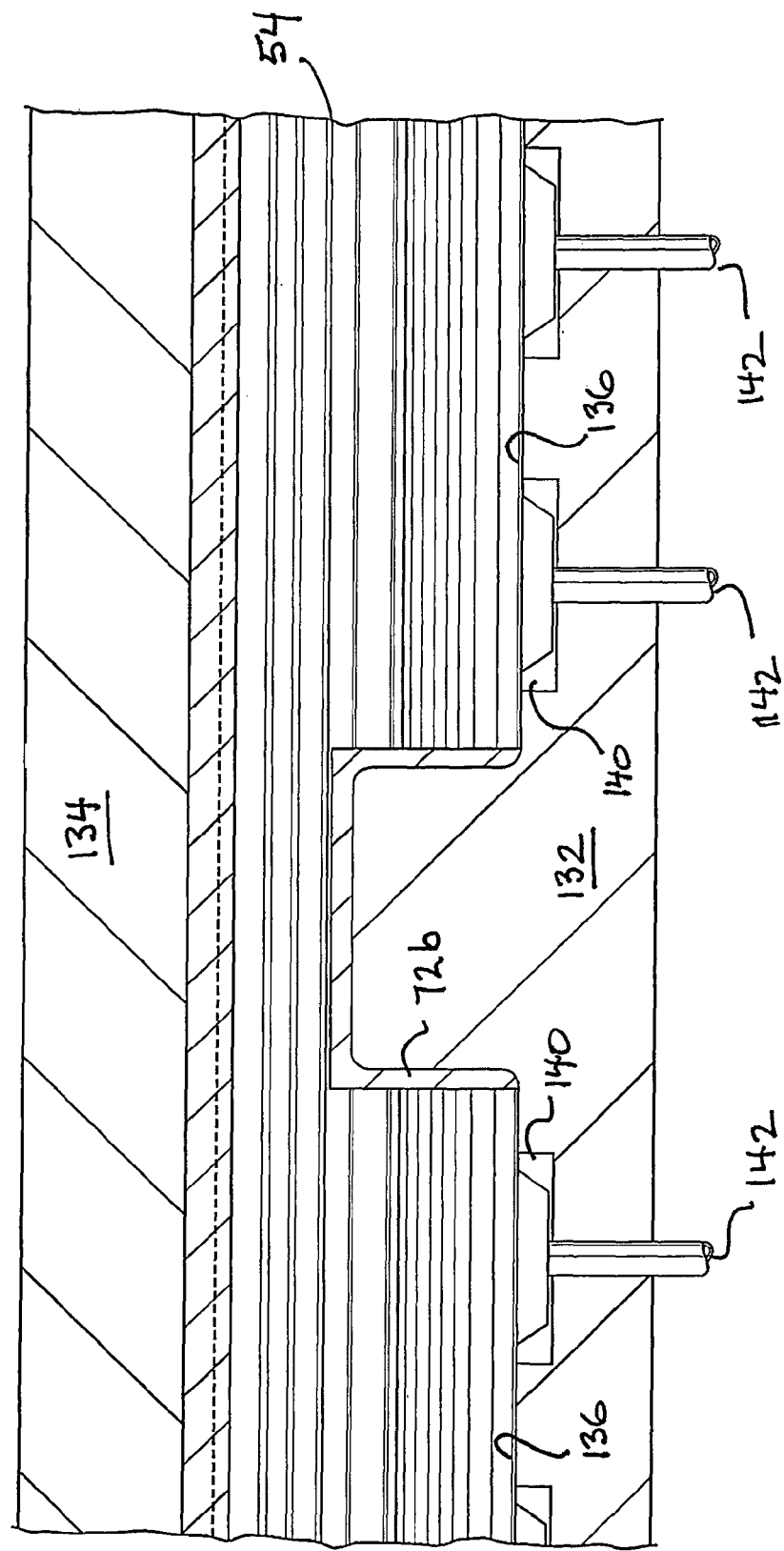
FIG. 10 provides a partial cross-sectional view of the moulding die platen used in the blow moulding die shown in FIG. 7, illustrating the securement of the reinforcing rib therein, prior to the formation of the overmould sidewall.
Figure 11:
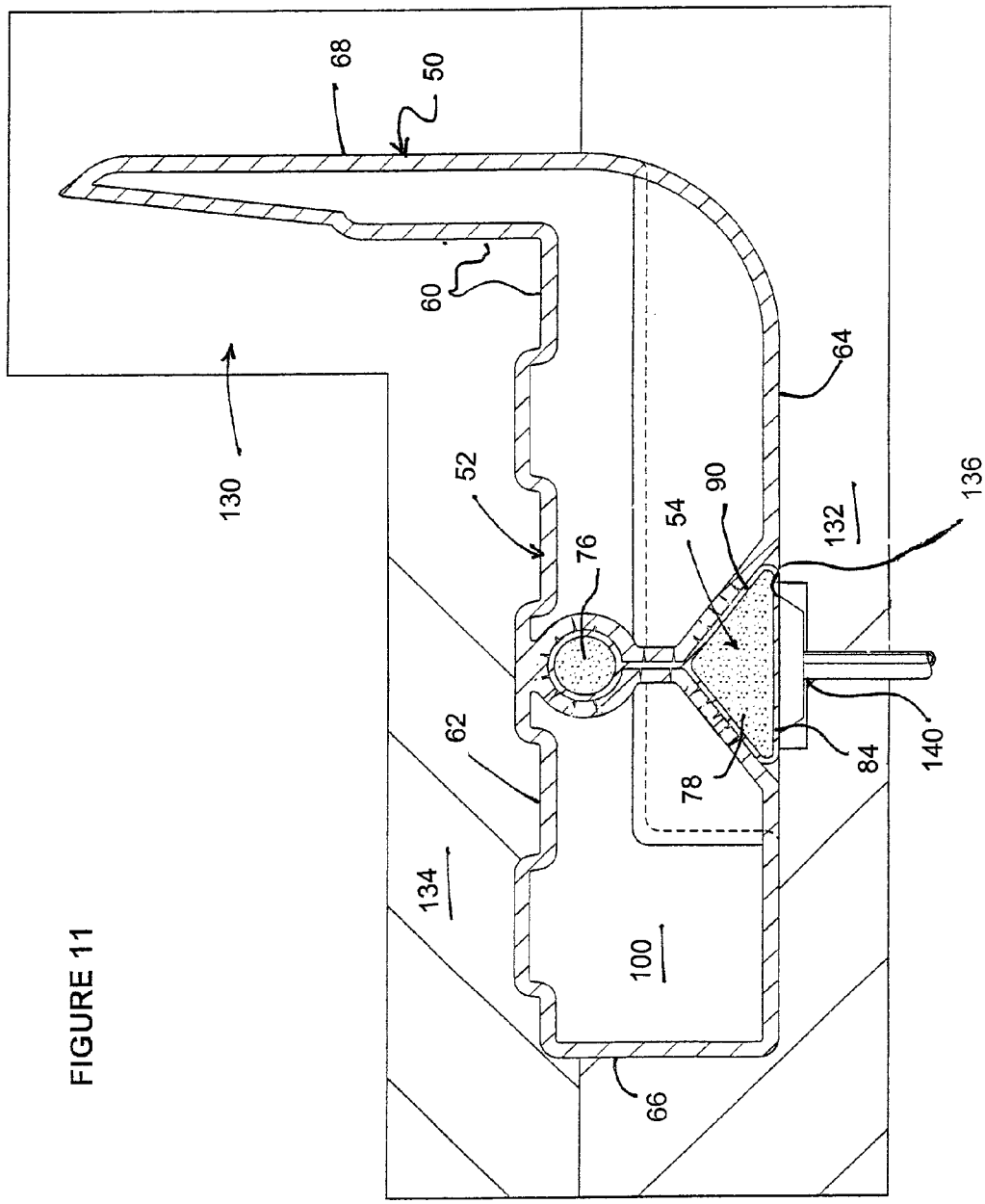
FIG. 11 shows a cross-sectional view of the blow mould running board illustrating the partial and encapsulation of the reinforcing rib by the overmould sidewall, immediately following blow moulding operation.

FIGS. 7 and 11 show best, the bottom platen 132 as being provided with a longitudinally elongated vacuum channel 136. The channel 136 is formed having a flat bottom sized to receive therein in juxtaposed contact the bottom 84 of the reinforcing rib 54. The vacuum channel 136 is further provided with a series of longitudinally spaced vacuum manifold apertures 140 which are fluidically coupled by associated vacuum lines 142 (FIG. 10) to a negative pressure source (not shown). The apertures 140 are spaced along the bottom of the channel 136 at locations selected whereby the activation of the vacuum source effects a sufficient negative pressure to releasably secure a reinforcing rib 54 to the bottom platen 132, with the bottom 84 of the lower flange 78 in juxtaposition within the vacuum channel 136.

To form the running board 50, a preformed reinforcing rib 54 is initially positioned in the platen 132 in a generally vertical orientation with its bottom 84 positioned in the vacuum channel 136. The vacuum source is actuated, drawing air through the apertures 140 via the associated vacuum lines 142, maintaining the rib 54 in the desired orientation during blow moulding operations. With the rib 54 so secured, the mould 130 is activated to hot extrude a parison 144 of melted base resin between the top and bottom platens 132,134. With the parison 144 hot extruded therebetween, the platens 132,134 are thereafter move together in the direction of arrows 200 closing the mould cavity. The heated parison 144 is thereafter stretched into the desired shape to form the sidewall 52 by blow moulding, encapsulating the stiffening rib 54 in the manner shown in FIG. 11. During stretching of the parison 144, the melt fingers 96 are contacted and partially melted and fuse bonded to the blown moulded plastic sidewall 52. The heat fusing of the blown plastic sidewall 52 with the melt fingers 96 further anchors the rib 54 in the desired vertical orientation within the interior of the running board 50.

Because the exposed rib bottom 84 and bottom surface 64 of the formed running board 50 is substantially flat, the formed part may be easily removed from the lower mould bottom platen 132 with minimum concern of die lock.

Because the formed running board 50 is made entirely with a glass reinforced plastic structure, any excess flash produced in moulding operations, as well as waste rib material or even entire rejected parts may be re-ground and re-melted for use in subsequent part manufacture. The current invention thus advantageously provides a more economical, waste-resistant manufacturing process.

In another possible construction, the rib 54 may be provided with one or more through-bores (not shown) in addition to or in place of the melt fingers 96. Such through-bores are sized to allow for the penetration of the blow moulded plastic therethrough, to facilitate stabilization and anchoring of the rib 54 within the running board interior 100.

Although the foregoing description describes the manufacture of a reinforced blow moulded running board 50 having a single stiffening rib 54, the invention is not so limited. It is to be appreciated that the running board 50 could be provided with multiple stiffening ribs 54 at lateral and/or longitudinally arranged orientations. In addition, the process of the present invention may be used in the manufacture of a variety of other types of blow moulded components and article for both vehicle and non-vehicle applications, with the result that the foregoing detailed description should not be viewed as limiting.

While the detailed description describes the rib 54 as having an upper flange 76 with a rounded-cross section profile, and a lower flange 78 having a generally triangular profile, the invention is not so limited. It is to be appreciated that depending upon the application and the load forces to be carried, the reinforcing rib 54 may be provided with a number of different profiles. In one alternate, non-limiting embodiment, both the upper and lower flanges 76,78 could be provided as generally planar lateral projections. In an alternate possible design, the reinforcing rib 54 may be formed having an L-shaped profile. Other rib profile designs are also possible will now become apparent.

While the detailed description describes and illustrates various preferred embodiments, the invention is not so limited. Many modifications and variations will now occur to a person skilled in the art. For a definition of the invention, reference may be had to the appended claims.

We claim:

1. A structurally reinforced blow moulded assembly, the blow moulded assembly comprising,
   an overmould member, said overmould member having a sidewall defining a hollow interior, a forward support surface and a rear surface generally parallel to and spaced from the forward support surface, the overmould member comprising between about 10% by weight to 30% by weight short glass fibers and about 70% by weight to about 90% by weight of a thermoplastic base resin, wherein said short glass fibers have a longitudinal length of less than about 10 cm, and
   at least one longitudinally elongated reinforcing rib insert, said reinforcing rib insert being partially encapsulated by said sidewall, the reinforcing rib insert including:
      a forward flange member in bearing contact with an interior side of said forward support surface,
      a rearward flange member spaced from the forward flange member and providing a rearward bearing surface generally coplanar with said rear surface, and
      a longitudinal extending connecting web joining the forward flange member to the rearward flange member,
   each of the forward and rearward flange members comprising about 40% by weight to about 70% by weight long glass fibers and about 30% by weight to about 60% by weight of a bonding resin, wherein said long glass fibers have a longitudinal length of greater than about 25 cm up to a length corresponding to a longitudinal length of said reinforcing rib insert, wherein the forward flange member and the connecting web are at least partially melt bonded to the sidewall to assist in anchoring the reinforcing rib insert to said overmould member.

2. The blow moulded assembly as claimed in claim 1, wherein the long glass fibers are co-mingled with said bonding resin, said long glass fibers being oriented in a generally parallel orientation.

3. The blow moulded assembly as claimed in claim 1, wherein said blow moulded assembly comprises a vehicle part selected from the group consisting of a vehicle running board, a seat back, a bumper beam, and a vehicle load floor.

4. The blow moulded assembly as claimed in claim 1, wherein the forward flange member, the rearward flange member and the connecting web are mould-formed from a substantially homogeneous interfusion of said long glass fibers and said bonding resin.

5. The blow moulded assembly as claimed in claim 1, Wherein the connecting web consists of said bonding resin.

6. The blow moulded assembly as claimed in claim 5, wherein said forward flange member and said connecting web include an outer resin layer at least partially melt bonded to said base resin.

7. The blow moulded assembly as claimed in claim 6, wherein the reinforcing rib insert is a pultrusion-moulded rib, the outer resin layer comprising a plurality of longitudinally extending melt ribs for melt bonding with said thermoplastic base resin during blow moulding.

8. The blow moulded assembly as claimed in claim 1, wherein the reinforcing rib insert comprises a generally I-beam shaped rib.

9. The blow moulded assembly as claimed in claim 1, wherein said thermoplastic base resin is selected from the group consisting of ABS, polyethylene, and polypropylene.

10. The blow moulded assembly as claimed in claim 9, wherein the bonding resin is selected the same as the thermoplastic base resin.

11. The blow moulded assembly as claimed in claim 10, wherein said reinforcing rib insert comprises up to 50% by weight said long glass fibers and at least 50% by weight said bonding resin.

12. The blow moulded assembly as claimed in claim 1, wherein the longitudinal length of said reinforcing rib insert is greater than about 0.5 m, said connecting web has a lateral thickness of less than about 3 mm, and said forward flange member and said rearward flange member have a maximum lateral width of between about 0.5 cm and 4 cm.

13. The blow moulded assembly of claim 12, wherein the thickness of the connecting web is less than 1 mm, and the maximum lateral width of the forward flange member is between about 0.75 cm and 2.5 cm.

14. A structurally reinforced vehicle part, the structurally reinforced vehicle part comprising:
an overmould body having a sidewall defining a hollow interior, a forward surface and a rear surface spaced from the forward surface, the overmould body comprising between about 10% by weight to 30% by weight short glass fibers and about 70% by weight to 90% by weight of a thermoplastic resin, wherein said short glass fibers have a longitudinal length of less than about 10 cm, and
a longitudinally elongated reinforcing rib reinforcing said forward surface against a rearward load force, the reinforcing rib at least partially encapsulated by said sidewall and including:
a longitudinally extending forward flange member in substantially bearing contact with a portion of said sidewall defining said forward surface,
a longitudinally extending rearward flange member spaced from the forward flange member and having a rearward bearing surface disposed in a generally coplanar orientation with said rear surface, and
a longitudinally extending connecting web joining the forward flange member to the rearward flange member,
the reinforcing rib comprising about 30% by weight to about 70% by weight long glass fibers having a longitudinal length of greater than about 50 cm up to a length corresponding to a longitudinal length of said reinforcing rib and about 30% by weight to about 70% by weight of said thermoplastic resin, wherein at least one of said forward flange member and said connecting web are melt bonded to said sidewall.

15. The vehicle part as claimed in claim 14, wherein the reinforcing rib comprises a moulded rib comprising heat-fused long glass fibers co-mingled with said thermoplastic resin so that said long glass fibers are oriented in a generally parallel direction.

16. The vehicle part as claimed in claim 14, wherein said vehicle part is selected from the group consisting of a vehicle running board, a vehicle seat back, a bumper beam, and a vehicle load floor, and the thermoplastic resin comprises at least one resin selected from the group consisting of ABS, polyethylene and polypropylene.

17. The vehicle part as claimed in claim 14, wherein said reinforcing rib is a generally I-beam shaped rib having a longitudinal length greater than about 1.0 m,
said connecting web has a lateral thickness of less than about 3 mm, and
said forward flange member and said rearward flange member have a maximum lateral width of between about 0.5 cm and 4 cm.

18. The vehicle part as claimed in claim 14, wherein
each of said forward and rearward flange members comprises between about 40% by weight to 70% by weight of said long glass fibers, the longitudinal length of said long glass fibers being greater than about 100 cm up to a length corresponding to the longitudinal length of said reinforcing rib, and about 30% by weight to about 60% by weight of said thermoplastic resin, and
each of said forward flange member and connecting web being substantially melt bonded to said sidewall.

19. A vehicle running board comprising:
an overmould composite plastic step, said step having a sidewall defining a hollow interior portion, an upper support surface for supporting a user thereon, and a lower mounting surface spaced from the upper support surface, the step comprising between about 10% to 30% by weight short glass fibers having a longitudinal length of less than about 1 cm and about 70% to 90% by weight of a resin selected from the group consisting of ABS, polyethylene, and polypropylene, and
at least one reinforcing rib, said reinforcing rib having an elongated longitudinal length and comprising:
an upper flange member, a lower flange member, and a connecting web extending between and joining said upper and lower flange members,
each of said upper and lower flange members comprising between about 405 by weight to 70% by weight long glass fibers having a longitudinal length greater than about 50 cm, and about 30% by weight to about 60% by weight of said resin,
said upper flange member and connecting web being substantially encapsulated within and retained by said sidewall, with an upper portion of said upper flange member disposed substantially adjacent to said upper support surface and a bottom portion of said lower flange member in substantially co-planar alignment with an adjacent portion of said rear surface, whereby load forces on said upper support surface are at least partially carried by said reinforcing rib,
said upper flange member and connecting web being melt bonded to said sidewall.

20. The vehicle running board as claimed in claim 19, wherein said long glass fibers comprise generally parallel oriented fibers co-mingled with said resin.

21. The vehicle running board as claimed in claim 20, wherein said reinforcing rib comprises a pultruded rib, said long glass fibers being pultrusion-moulded in a generally parallel orientation.

22. The vehicle running board as claimed in claim 19, wherein each of said upper flange member and said lower flange member comprise an outermost layer of said resin.

23. The vehicle running board as claimed in claim 22, wherein said connecting web consists of said resin.

24. The vehicle running board as claimed in claim 19, wherein said upper flange member comprises a generally cylindrical member.

25. The vehicle running board as claimed in claim 24, wherein the longitudinal length of said reinforcing rib is greater than about 0.5 m,
   said connecting web having a lateral thickness of less than about 3 mm, and
   said upper flange member and said lower flange member have a maximum lateral width of between about 0.75 cm and 2.5 cm.

\* \* \* \* \*